United States Patent
Gotti et al.

(10) Patent No.: US 6,880,682 B2
(45) Date of Patent: Apr. 19, 2005

(54) WHEEL SUPPORT FOR VEHICLES WITH DISK BRAKES

(75) Inventors: Giovanni Gotti, Alme' (IT); Giovanni Mario Tironi, Dalmine (IT)

(73) Assignee: Freni Brembo S.p.A. (IT)

( * ) Notice: Subject to any disclaimer, the term of this patent is extended or adjusted under 35 U.S.C. 154(b) by 37 days.

(21) Appl. No.: 10/466,801

(22) PCT Filed: Nov. 27, 2001

(86) PCT No.: PCT/IT01/00600
§ 371 (c)(1),
(2), (4) Date: Jul. 16, 2003

(87) PCT Pub. No.: WO03/045712
PCT Pub. Date: Jun. 5, 2003

(65) Prior Publication Data
US 2004/0050632 A1 Mar. 18, 2004

(51) Int. Cl.⁷ .............................................. B60B 27/02
(52) U.S. Cl. ......................... 188/218 XL; 188/218 R; 301/6.7; 301/6.8
(58) Field of Search ........................ 188/18 A, 218 XL, 188/218 R; 301/6.7, 6.8

(56) References Cited

U.S. PATENT DOCUMENTS

| | | | |
|---|---|---|---|
| 5,507,367 A | 4/1996 | Dagh et al. | 188/18 |
| 5,540,303 A | 7/1996 | Bodin et al. | 188/18 |
| 6,330,937 B1 * | 12/2001 | Dagh et al. | 188/18 A |
| 6,446,765 B1 * | 9/2002 | Dabertrand et al. | 188/18 A |
| 6,467,588 B1 * | 10/2002 | Baumgartner et al. | 188/218 XL |
| 6,564,913 B2 * | 5/2003 | Baumgartner et al. | 118/218 XL |

FOREIGN PATENT DOCUMENTS

| | | |
|---|---|---|
| EP | 0680836 | 11/1995 |
| EP | 0783980 | 7/1997 |
| EP | 0860626 A3 | 8/1998 |
| EP | 0860626 A2 | 8/1998 |
| FR | 2687614 | 8/1993 |

* cited by examiner

Primary Examiner—Matthew C. Graham
(74) Attorney, Agent, or Firm—Sofer & Haroun, LLP

(57) ABSTRACT

A wheel support for providing a connection, rotatable about an axis (S), between a wheel of a vehicle which can be braked by a disk brake and the stub axle (6) of the vehicle comprises a bell (24) suitable for supporting a braking band (25) and a connection flange (14) for the connection of the vehicle wheel. The bell (24) and the connection flange (14) are formed integrally, constituting a single body (2) which can be connected rotatably and releasably to the stub axle (6) of the vehicle.

29 Claims, 5 Drawing Sheets

WHEEL SUPPORT FOR VEHICLES WITH DISK BRAKES

BACKGROUND OF THE INVENTION

The subject of the present invention is a wheel support for providing a rotatable connection between a wheel and suspension means of a vehicle with disk brakes, in particular a heavy vehicle the wheel flange of which has an outside diameter larger than the inside diameter of the brake disk used.

In these vehicles, a worn brake disk is generally replaced by dismantling the wheel-bearing unit.

However, the life of the bearings, which is generally longer than that of the brake disks, is guaranteed by producers only if the bearings are never dismantled after their initial assembly.

There is therefore a need to provide braking systems which enable the brake disk to be replaced without dismantling the bearing unit.

Solutions have been proposed to fulfil this need but, although they avoid dismantling the bearing, they have other disadvantages. For example, there are known disk brakes with braking bands which are divided into two parts connected to one another releasably to enable them to be replaced without the need to remove the bearing unit from the stub axle.

The main disadvantage of this solution is that it is difficult to ensure precise alignment between the two portions of the braking band, particularly in an axial direction, because of working tolerances both of the two parts of the braking band and of the connection between them.

As a result, the braking surfaces of the two assembled parts do not define a single braking surface and a stepped discontinuity is formed along the line of the joint between the two parts of the braking band. During braking, this step acts as a tool which removes friction material from the braking surfaces of the pads, causing rapid and uneven wear of the pads.

A further system of the prior art comprises a bearing, a brake disk, and a wheel hub, which are independent of one another and which can be connected by a set of screws, the screws being inserted in suitable holes provided in the wheel hub and in the bell of the brake disk and screwed into threaded holes in the outer ring of the bearing, clamping the bell of the brake disk between the wheel hub and the bearing, as can be seen in FIG. 2.

Although this solution does not require operation on the bearing during the replacement of the worn brake disk, it has the disadvantage of the presence of a fairly large bell which cannot be reused after the replacement of the disk.

Moreover, in this solution it is necessary to provide for two centring arrangements, that is, centring of the disk on the bearing and centring of the wheel hub on the disk bell, requiring at least four machining operations which are difficult and expensive to perform.

Furthermore, any use of axially slidable braking bands is rendered difficult and expensive by the large number of parts to be produced and assembled.

With regard to the structural behaviour of the systems of the prior art, they have highly stressed connection members such as the pins and the bolts which connect the two sectional portions of the brake disk, as well as the screws for connecting the wheel hub and the brake-disk bell to the bearing. In particular, during braking, the latter have to ensure that the joint they form can transmit the braking torque from the brake-disk bell to the wheel flange.

SUMMARY OF THE INVENTION

The object of the present invention is therefore to propose a wheel support for vehicles of the type specified above which enables worn parts of the braking system to be replaced without the need to perform operations on the bearing, at the same time overcoming the disadvantages of the prior art.

Within the object of the invention set out above, a further aim is to provide a wheel support having characteristics such as to stress the principal connection members uniformly and such as to favour easy and safe replacement of the brake disk.

These and other objects are achieved by means of a wheel support according to claim 1.

BRIEF DESCRIPTION OF THE DRAWINGS

For a better understanding of the invention, a non-limiting embodiment thereof is described below and is shown in the appended drawings, in which.

DESCRIPTION OF THE PREFERRED EMBODIMENTS

Figure 1:
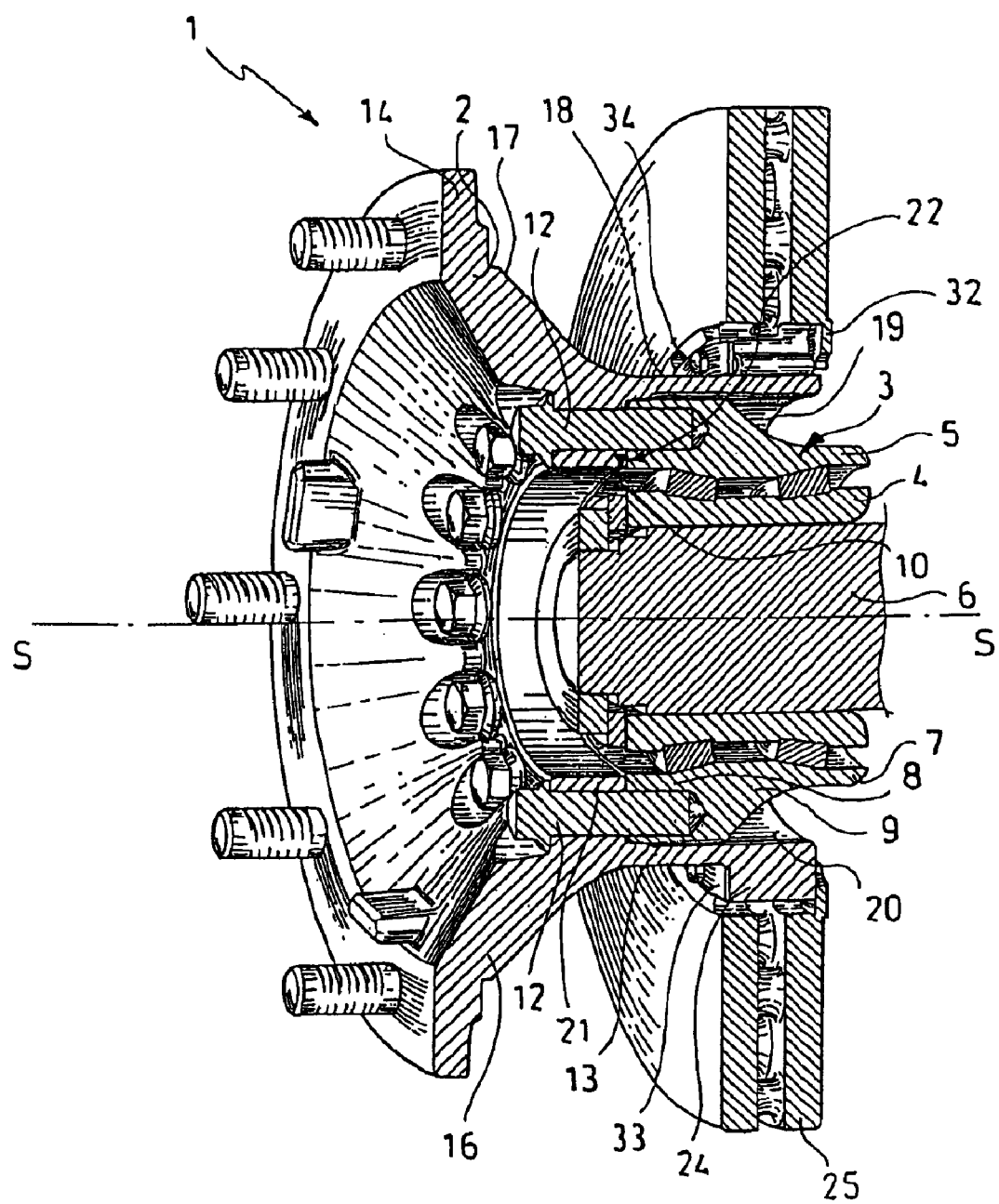
FIG. 1 is a sectioned, perspective view of a wheel-support unit according to the invention.
Figure 2:
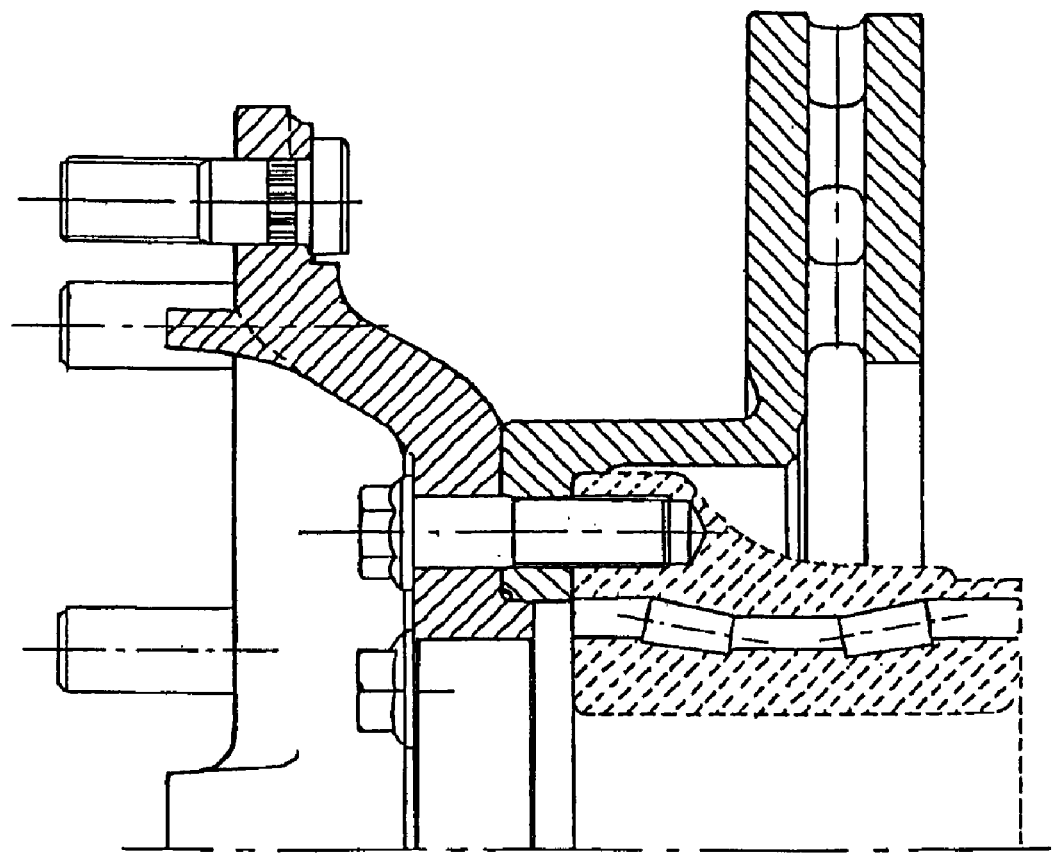
FIG. 2 is a view showing a wheel-support unit of the prior art, in section.
Figure 3:
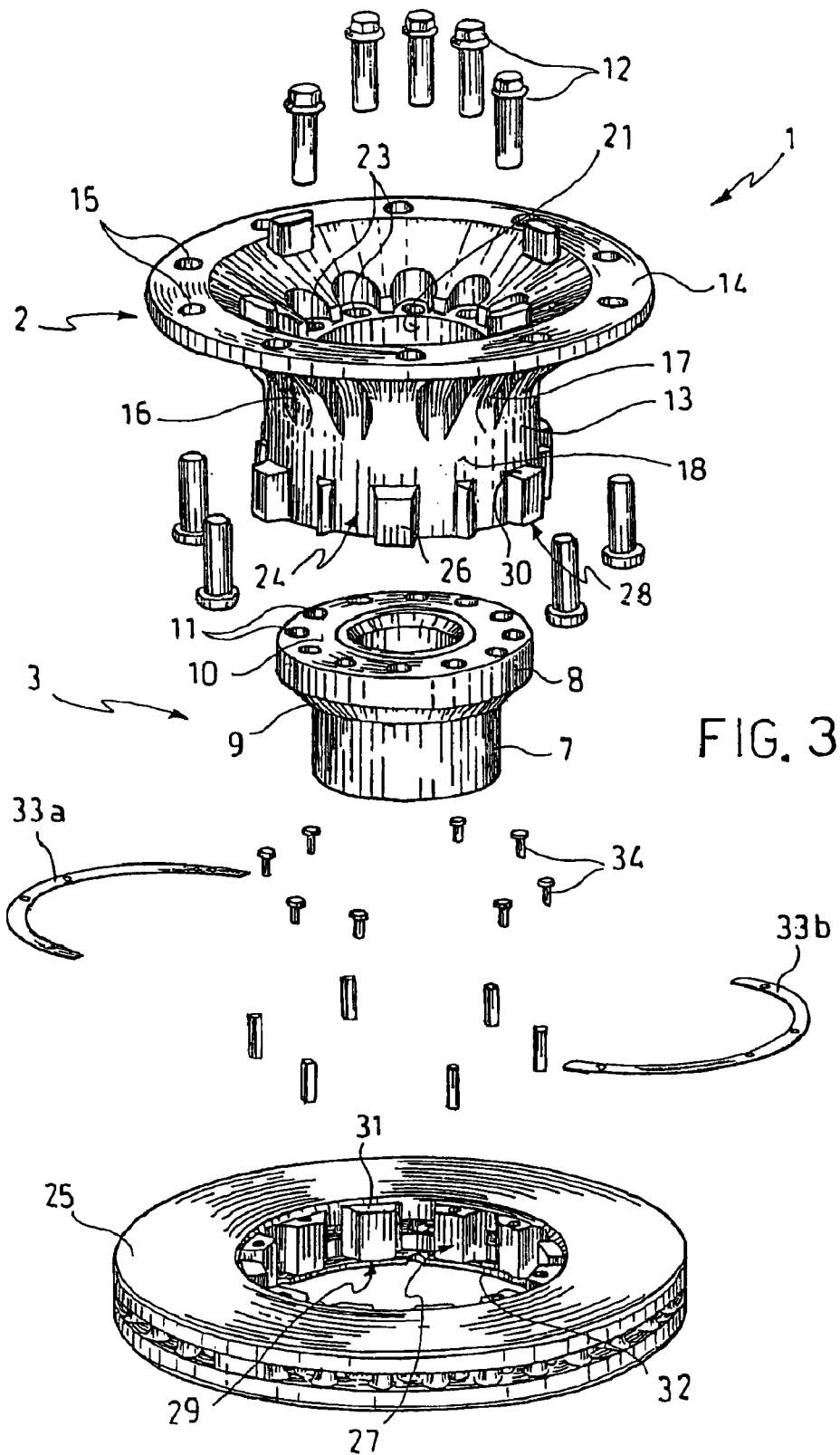
FIG. 3 is an exploded view of the wheel-support unit of FIG. 1.
Figure 4:
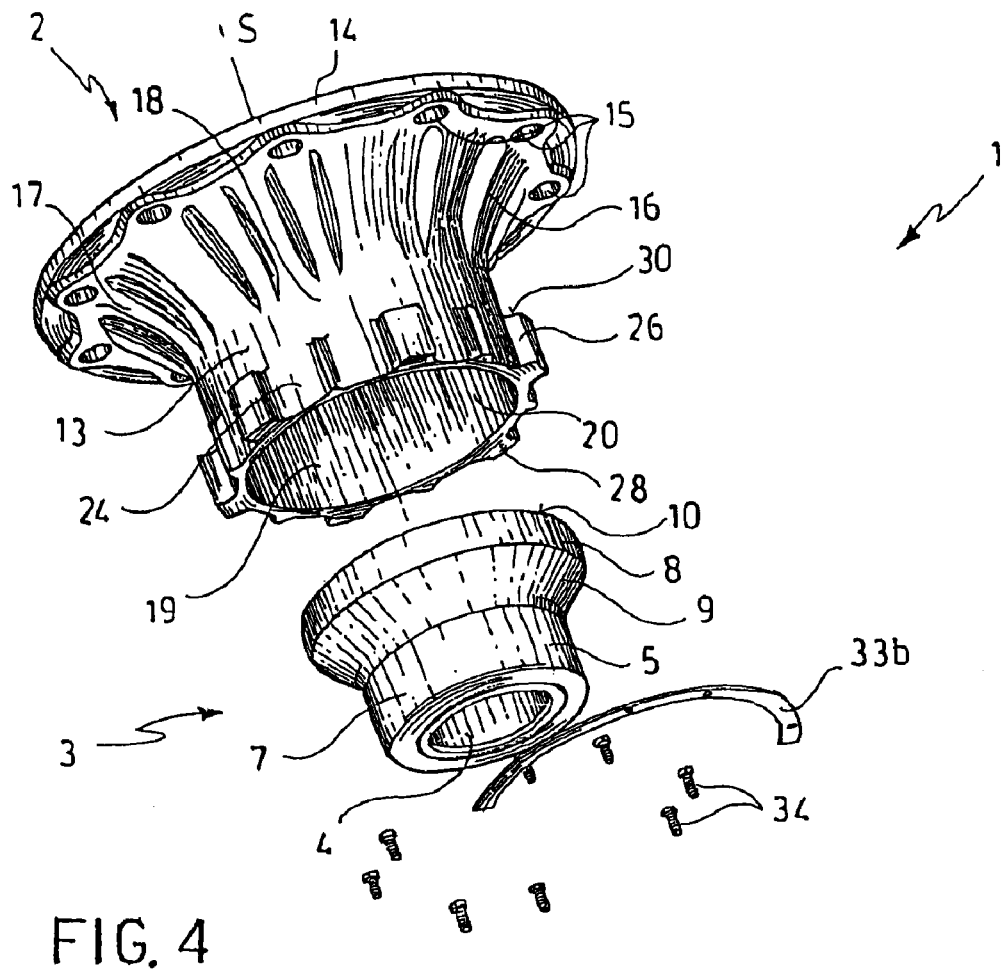
FIG. 4 is a further exploded view of the wheel-support unit of FIG. 1.
Figure 4:
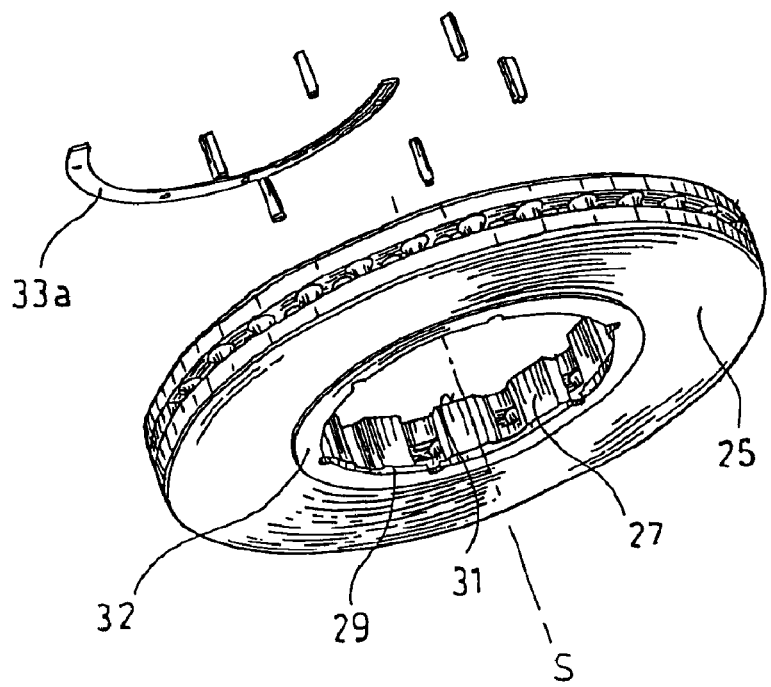

With reference to FIGS. 1, 3 and 4, a wheel-support unit is generally indicated 1. The wheel-support unit comprises a connection flange 14, a bell 24, and a bearing 3, the connection flange 14 and the bell 24 being formed integrally so as to constitute a single body 2.

The terms "axial" and "radial" refer below to the axis of rotation of the individual components (the brake disk, the wheel, the outer ring of the bearing) when they are mounted on the vehicle. This rotation axis coincides substantially with the axis S of symmetry or of axial symmetry of the above-mentioned components, as specified below. The expressions "interior of the vehicle" and "exterior of the vehicle", on the other hand, relate to the orientation of the components when they are mounted on the vehicle.

The single body 2 has a geometrical shape which is substantially that of an axially symmetrical body of revolution, comprising a tubular portion 13 facing towards the interior of the vehicle, as well as a substantially annular disk-shaped connection flange 14 perpendicular to the axis S. The connection flange 14 is formed on the end of the single body 2 remote from the tubular portion 13 and has a plurality of axial through-holes 15 distributed at intervals around a circle having its centre on the axis S. In known manner, the axial holes 15 house, with interference, a corresponding plurality of bolts, known as "studs", provided for the screwing of a plurality of nuts for the releasable connection of a wheel to the connection flange 14.

A substantially frustoconical connecting region 16 is formed between the tubular portion 13 and the connection flange 14 and is further reinforced by reinforcing ribs 17.

The tubular portion 13 of the single body 2 has an outer surface 18 and an inner surface 19. The inner surface 19 defines a substantially cylindrical seat 20 which can be fitted, along the axis S, onto a connecting portion 8 of the bearing 3, in order to house the connecting portion 8 at least partially but preferably completely.

As can be seen, for example, from FIG. 1, the seat 20 has a centring portion of limited depth the inside diameter of which corresponds substantially to the outside diameter of the connecting portion 8 of the bearing 3. The total depth of the seat 20 is greater than the axial length of the connecting portion 8.

The seat 20 is defined, in the axial direction, by a shoulder 21 with a flat abutment surface 22 substantially perpendicular to the axis S and facing towards the interior of the vehicle. The abutment surface 22 is at least partially complementary with a front surface 10 of the bearing 3.

The shoulder 21 has a plurality of axial through-holes 23 which open in the abutment surface 22. The holes 23 are distributed so as to be aligned with threaded holes 11 in the front surface 10 of the bearing 3 and can house a plurality of bolts 12 for releasable connection to the bearing 3.

According to one embodiment, the holes 23 are distributed at intervals around a circle having its centre on the axis S.

The outer surface of the tubular portion 13 of the single body 2 forms a bell region 24 for the releasable connection of a braking band 25 to the single body 2, fixing them for rotation together about the axis S. This releasable connection between the braking band 25 and the single body 2 takes place in known manner and only one of the possible connection methods will therefore be described below.

With reference to FIGS. 3 and 4, a plurality of projections, parallel to one another and to the axis S, are formed in the bell region 24 and project substantially radially, forming a set of teeth 26. The set of teeth 26 has an inner abutment surface 28 facing towards the interior of the vehicle and an outer abutment surface 30, facing towards the exterior of the vehicle.

The set of teeth 26 of the bell region 24 is intended to engage a corresponding set of teeth 27 formed around the circumference of the central opening of the braking band 25 and in turn provided with internal and external abutment surfaces 29 and 31, respectively.

According to one embodiment, the bell region 24 for the releasable connection of the braking band 25 to the single body 2 is disposed substantially centrally relative to the axial extent of the bearing 3.

The bearing 3 has an inner ring 4 which can be keyed to a stub axle 6 of a vehicle and an outer ring 5, associated rotatably with the inner ring 4, for example, by means of conical rollers housed in suitable rolling races between the two rings 4 and 5.

The bearing 3 as a whole is shaped geometrically substantially as an axially symmetrical body of revolution in which the outer ring 5 has a first tubular portion 7 and a second tubular portion which is enlarged radially relative to the first portion 7 and which constitutes the connecting portion 8. A substantially frustoconical transition region 9 is formed between the first tubular portion 7 and the connecting portion 8.

The connecting portion 8 comprises a flat front surface 10 substantially perpendicular to the axis S. The front surface 10 faces towards the exterior of the vehicle and is at least partially complementary with the abutment surface 22 of the single body 2.

A plurality of axial holes 11 formed in the front surface 10 are aligned with the through-holes 23 provided in the abutment surface 22 of the single body 2. The holes 11, which are threaded internally, are distributed at intervals around a circle having its centre on the axis S and are provided for the screwing of the plurality of bolts 12 for the releasable connection of the single body 2 to the connecting portion 8 of the bearing 3. The radial enlargement of the connecting portion 8 corresponds substantially to the space required to house the bolts 12.

According to the preferred embodiment, the bearing 3 is made of steel, the single body 2 of nodular cast iron, and the braking band of grey iron.

Figure 5:
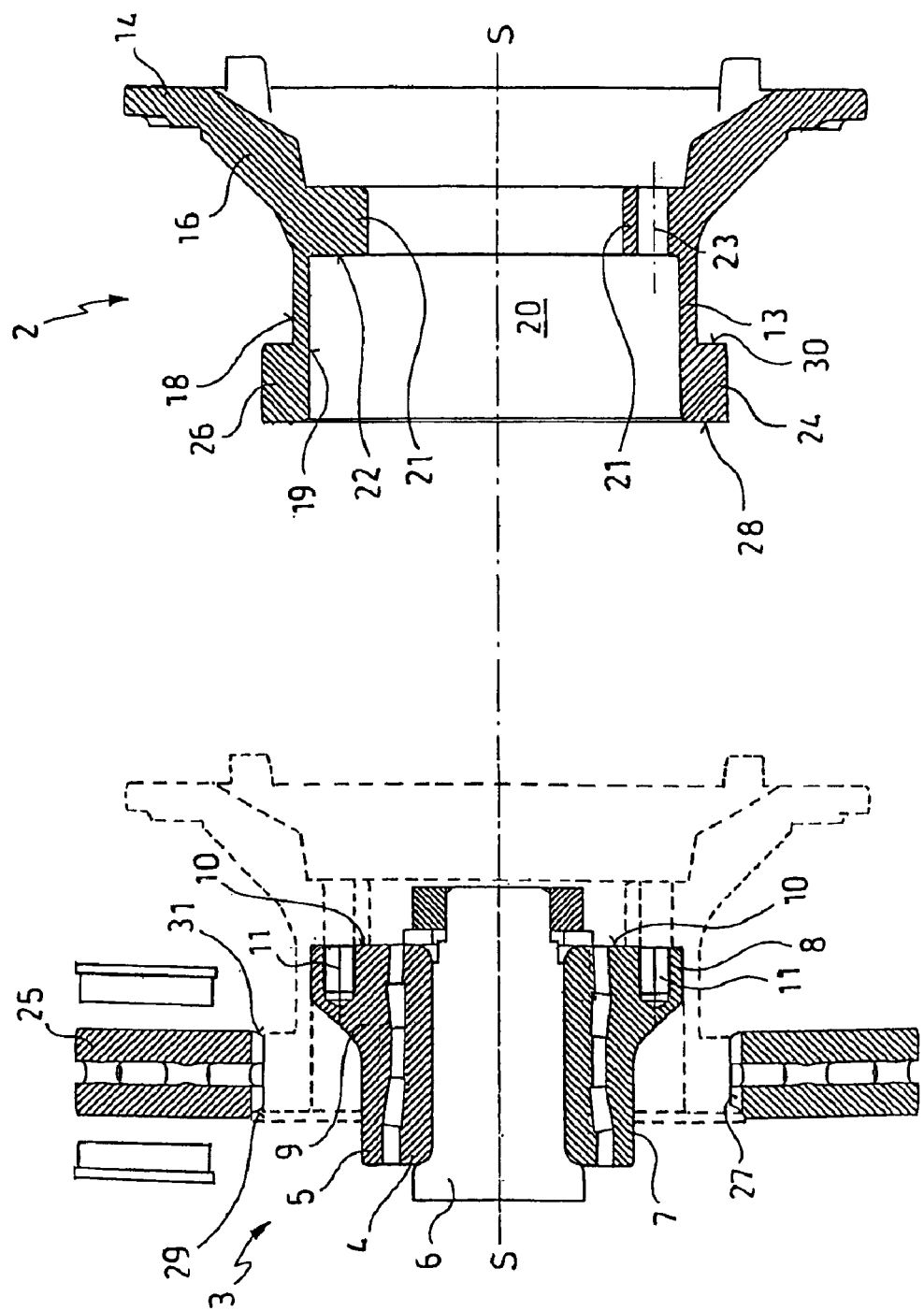
FIG. 5 shows, in section, the wheel-support unit of FIG. 1, after the removal of a component thereof.

The operation of the wheel-support unit 1 for vehicles with disk brakes is described below with reference to FIGS. 4 and 5.

For the initial mounting, the bearing 3, the single body 2, and the braking band 25 are arranged to be preassembled to form a single unit which is mounted on the stub axle 6 prior to the mounting of the caliper.

The bearing 3 is never opened again, throughout its entire life, guaranteed by the manufacturers.

The wheel is connected to the single body 2, in known manner, by means of a plurality of nuts which are screwed onto the studs of the connection flange 14.

During braking, the braking torque is transmitted by the sets of teeth 26 and 27 from the braking band 25 to the single body 2, and hence directly to the connection flange 14, without requiring any further stressing of the bolts 12 which connect the single body 2 to the bearing 3. The braking torque is transmitted from the single body 2 to the wheel by the joint formed by the wheel-mounting studs.

A worn braking band is replaced, after the wheel has been removed from the single body 2 by unscrewing of the screws 34 which restrain the braking band 25 axially in the bell region 24. The screws 34 can be reached easily from outside the vehicle, as can be seen, for example, from FIG. 1 or FIG. 3.

The bolts 12 are then unscrewed from the connecting portion 8, releasing the single body 2, which can easily be removed by being slid along the axis S.

Since the central opening in the braking band 25 has a diameter larger than the outside diameter of the bearing 3, it allows the worn braking band to be removed and replaced without any operation on the bearing 3. The individual pieces 33a, 33b of a keeper ring 33 can easily be separated from the tubular portion 13 of the single body 2 and can be re-used.

After the new braking band 25 has been positioned between the pads of the caliper by being supported, for example, directly on the outer ring 5 of the bearing 3, the single body 2 is put in place by fitting the seat 20 onto the connecting portion 8 of the bearing 3, along the axis S.

The substantially complementary shapes of the centring portion of the seat 20 and of the connecting portion 8 advantageously facilitate the locating of the single body 2, which is fixed by the screwing of the bolts 12 into the threaded holes 11 in the front surface 10 of the bearing 3.

During or after the positioning of the single body 2 on the bearing 3, the tubular portion 13 is inserted, again along the axis S, in the central opening of the braking band 25 in which the first set of teeth 26 in the bell region 24 engage the second set of teeth 27 of the braking band 25, achieving a form coupling which prevents their relative rotation about the axis S.

The braking band 25 is slid along the tubular portion 13, towards the connection flange 14, until a restraining ring 32 fixed firmly to or integral with a side of the braking band 25 comes into contact with the inner abutment surface 28 of the set of teeth 26 of the bell 24.

The individual pieces 33a, 33b of the keeper ring 33 are then placed against the outer abutment surfaces 30, 31 of the engaged sets of teeth 26, 27, from the exterior of the vehicle, and are connected to the braking band 25 by screws 34 in order to restrain the braking band axially in the bell region 24 of the single body 2.

The wheel-support unit 1 for vehicles with disk brakes according to the invention has many advantages.

In the first place, it enables worn braking bands to be replaced without any operation on the bearing and with the use of one-piece braking bands rather than the sectional braking bands of the prior art, resulting in low and uniform wear of the pads as well as a reduction in costs in comparison with braking bands of the prior art.

The present invention also enables the various components to be optimized independently of one another, both with regard to the construction material and with regard to their geometrical shapes. For example, the structural separation of the braking band from the bell enables the bell itself, that is, the single body, to be made of a more expensive and stronger material than the material of the braking band. The thickness of the single body can consequently also be limited in comparison with that of the bell of the prior art, achieving a reduction in weight and hence a saving in material.

The bolts 12 which connect the single body to the bearing are not stressed further during braking and the braking torque is transmitted directly to the connection flange 14.

The wheel-support unit 1 is very strong and has an optimal distribution of forces when the vehicle is in operation and in particular during heavy braking.

The operations to fit and replace the braking bands are quicker and therefore cheaper than those of the prior art and fitting is further facilitated by the shapes of the connecting portion 8 and of the seat 20 of the single body 2.

Naturally, variations and/or additions may be applied to the embodiment described and illustrated, without departing from the scope of the invention.

For example, the connecting portion 8 and the seat 20 may have one or more complementary surfaces 10, 19, 22 for achieving a form coupling between the outer ring 5 of the bearing 3 and the single body 2.

According to one embodiment, this form coupling can prevent or limit a relative translational movement between the outer ring 5 of the bearing 3 and the single body 2 in a direction substantially perpendicular to the axis S.

According to this embodiment, the form coupling also prevents or limits relative rotational movement about the axis S between the outer ring 5 of the bearing 3 and the single body 2.

According to an alternative embodiment, the bearing 3 has a substantially cylindrical overall shape which enables the single body 2 to be fitted on the bearing 3 in any angular position during mounting.

Naturally, in order to satisfy contingent and specific requirements, a person skilled in the art may apply to the wheel-support unit for vehicles with disk brakes according to the present invention further modifications and variations all of which, however, are included within the scope of protection of the invention as defined by the appended claims.

What is claimed:

1. A wheel support for providing a connection, rotatable about an axis, between a wheel of a vehicle which can be braked by a disk brake and suspension means of the vehicle, the support comprising a bell for supporting a braking band and a connection flange for supporting the vehicle wheel, wherein the bell and the connection flange are formed integrally, constituting a single body which can be connected rotatably and releasably to the suspension means by a releasable connection to a bearing, keyed to said suspension means, wherein said single body has a substantially tubular portion formed of a single layer having an inner surface and an outer surface, where the outer surface forms said bell and the inner surface forms a seat for the releasable connection to the bearing.

2. A wheel support according to claim 1 in which the seat of the single body has a depth such that it can at least partially house the bearing.

3. A wheel support according to claim 1 in which the single body can be connected releasably to the bearing by means of a plurality of bolts.

4. A wheel support according to claim 3 in which the single body comprises a shoulder provided with a flat abutment surface substantially perpendicular to its axis, the shoulder having a plurality of through-holes which open in the abutment surface and are distributed in alignment with internally-threaded holes provided in a front surface of the bearing, the through-holes being able to house the plurality of bolts.

5. A wheel support according to claim 4 in which the through-holes are distributed at intervals around a circle having its centre on the axis.

6. A wheel support according to claim 1 in which the single body as a whole is shaped substantially as an axially symmetrical body of revolution.

7. A wheel support according to claim 1 in which the connection flange is formed as a substantially annular disk perpendicular to the axis and has a plurality of holes for housing bolts for the releasable connection of the wheel.

8. A wheel support according to claim 7 in which the holes house the bolts with interference.

9. A wheel support according to claim 7 in which the connection flange is formed on the end of the single body remote from the seat.

10. A wheel support according to claim 9 in which a substantially frustoconical connecting region is formed between the connection flange and the tubular portion.

11. A wheel support according to claim 10 in which the connecting region has one or more reinforcing ribs.

12. A wheel support according to claim 1 in which the bell region of the single body is suitable for forming a releasable connection with the braking band, by means of suitable restraining means.

13. A wheel support according to claim 12 in which the restraining means comprise a set of teeth formed around the outer circumference of the bell region suitable for engaging a corresponding set of teeth formed around the circumference of the central opening of the braking band in order to achieve a releasable connection between the single body and the braking band, fixing them for rotation together about the axis.

14. A wheel support according to claim 13 in which the set of teeth comprises abutment surfaces which, together with corresponding abutment surfaces of the set of teeth of the braking band, are in abutment with one or more restraining rings for preventing axial sliding of the braking band, at least beyond the limits provided for by the bell region of the single body.

15. A wheel-support unit according to claim 1 in which the direction in which the seat of the single body is fitted on the connecting portion of the bearing coincides substantially with the axis.

16. A wheel-support unit according to claim 15 in which the seat of the single body is formed by a substantially cylindrical cavity having a centring portion, the inside diameter of which corresponds substantially to the outside diameter of the connecting portion of the bearing.

17. A wheel-support unit according to claim 16 in which, in the mounted condition, the bell region is disposed substantially centrally relative to the axial extent of the bearing.

18. A wheel-support unit comprising a wheel support according to claim 1 as well as a bearing comprising an inner ring which can be fixed firmly to the suspension means, and an outer ring associated rotatably with the inner ring and having a connecting portion to which the single body can be fixed removably by means of the plurality of bolts.

19. A wheel-support unit according to claim 18 in which the connecting portion of the bearing and the seat of the single body have one or more respective complementary surfaces.

20. A wheel-support unit according to claim 19 in which at least one of the one or more complementary surfaces achieves a form coupling between the connecting portion of the bearing and the seat of the single body when the single body is in the mounted condition on the bearing.

21. A wheel-support unit according to claim 20 in which the form coupling can restrain or limit a translational relative movement between the bearing and the single body in a direction perpendicular to the axis.

22. A wheel-support unit according to claim 20 or claim 21 in which the form coupling can restrain and/or limit a rotational relative movement between the outer ring of the bearing and the single body, about the axis.

23. A wheel-support unit according to claim 19 in which the connecting portion of the outer ring comprises a flat front surface substantially perpendicular to the axis and at least partially complementary with the abutment surface of the single body, the front surface having a plurality of holes which open in the front surface and which are distributed so as to be aligned with the through-holes provided in the abutment surface of the single body, the holes being suitable for housing the plurality of bolts.

24. A wheel-support unit according to claim 23 in which the holes in the front surface of the bearing are internally threaded.

25. A wheel-support unit according to claim 23 or claim 24 in which the outer ring of the bearing comprises a first substantially tubular portion and a second substantially tubular portion which is radially enlarged in comparison with the first tubular portion and which constitutes the connecting portion.

26. A wheel-support unit according to claim 25 in which the outer ring comprises a substantially frustoconical transition region between the first substantially tubular portion and the connecting portion.

27. A wheel-support unit according to claim 18 in which the bearing as a whole is shaped as a substantially axially symmetrical body of revolution.

28. A suspension for vehicles which can be braked by disk brakes, comprising a wheel-support unit according to claim 18.

29. A bearing suitable for use in a wheel-support unit according to claim 18.

* * * * *